US012168311B2

(12) United States Patent
Salieri et al.

(10) Patent No.: US 12,168,311 B2
(45) Date of Patent: Dec. 17, 2024

(54) MACHINE AND METHOD FOR COMPACTING POWDER MATERIAL

(71) Applicant: SACMI COOPERATIVA MECCANICI IMOLA SOCIETA' COOPERATIVA, Imola (IT)

(72) Inventors: Marco Salieri, Imola (IT); Alan Babini, Imola (IT); Mauro Bertozzi, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 303 days.

(21) Appl. No.: 17/278,020

(22) PCT Filed: Sep. 20, 2019

(86) PCT No.: PCT/IB2019/057990
§ 371 (c)(1),
(2) Date: Mar. 19, 2021

(87) PCT Pub. No.: WO2020/058933
PCT Pub. Date: Mar. 26, 2020

(65) Prior Publication Data
US 2021/0347088 A1 Nov. 11, 2021

(30) Foreign Application Priority Data
Sep. 21, 2018 (IT) ........................ 102018000008828

(51) Int. Cl.
*B28B 17/00* (2006.01)
*B28B 3/12* (2006.01)
(Continued)

(52) U.S. Cl.
CPC .......... *B28B 17/0081* (2013.01); *B28B 3/123* (2013.01); *B30B 5/06* (2013.01); *B30B 15/308* (2013.01)

(58) Field of Classification Search
None
See application file for complete search history.

(56) References Cited

U.S. PATENT DOCUMENTS 9,452,546 B2 9/2016 Kroll
11,345,060 B2 5/2022 Ursella et al.
2019/0240864 A1* 8/2019 Ursella .............. B28B 17/0036

FOREIGN PATENT DOCUMENTS

CN 1792592 A 6/2006
CN 1809448 A 7/2006
(Continued)

OTHER PUBLICATIONS

International Search Report and Written Opinion for PCT/IB2019/057990 mailed Jan. 31, 2020.
(Continued)

*Primary Examiner* — S. Behrooz Ghorishi
*Assistant Examiner* — Adrianna N Konves
(74) *Attorney, Agent, or Firm* — Workman Nydegger

(57) ABSTRACT

A machine and method for compacting a powder material; the machine comprises a compacting device, which is adapted to compact the powder material; a conveyor assembly to convey a layer of powder material, along a portion of a given path, to the compacting device; and an adjusting assembly, which is adapted to change the width of the layer of powder material along the portion of the given path and consequently the thickness of the layer of powder material at its longitudinal edges.

5 Claims, 4 Drawing Sheets

(51) Int. Cl.
*B30B 5/06* (2006.01)
*B30B 15/30* (2006.01)

(56) References Cited

FOREIGN PATENT DOCUMENTS

| | | | |
|---|---|---|---|
| CN | 103874564 | A | 6/2014 |
| CN | 106671263 | A | 5/2017 |
| DE | 102011076655 | | 11/2012 |
| RU | 2606142 | C2 | 1/2017 |
| WO | 2005/005115 | A1 | 1/2005 |
| WO | 2013/050865 | A1 | 4/2013 |
| WO | 2013050845 | | 4/2013 |
| WO | 2015019166 | | 2/2015 |
| WO | 2017216725 | | 12/2017 |
| WO | 2018/051257 | A1 | 3/2018 |
| WO | 2018/073783 | A1 | 4/2018 |
| WO | 2018/163124 | A1 | 9/2018 |

OTHER PUBLICATIONS

International Preliminary Report on Patentability received for PCT Patent Application No. PCT/IB2019/057990, mailed on Apr. 1, 2021, 9 pages.

"Auto Adjust Conveyor Rail by ASTRRA. Patented system!", Retrieved from https://www.youtube.com/watch?v=3QK4p5GI06E, May 1, 2010, pp. 1-2.

"Pneumatic Guide Rails for RCO by Multi-Conveyor", Retrieved from https://www.youtube.com/watch?v=uVWV_wO1msY, Mar. 23, 2015, pp. 1-3.

Office Action received for Brazil Patent Application No. 112021005298-4, mailed Apr. 1, 2024, 4 pages.

* cited by examiner

MACHINE AND METHOD FOR COMPACTING POWDER MATERIAL

CROSS-REFERENCE TO RELATED APPLICATIONS

This patent application is a 371 US Nationalization of International Patent Application No. PCT/IB2019/057990, filed Sep. 20, 2019, which claims priority from Italian Patent Application No. 102018000008828, filed Sep. 21, 2018. The entire disclosures of the aforementioned applications are incorporated herein by reference.

TECHNICAL FIELD

The present invention relates to a method and a machine for compacting a powder material comprising ceramic powder. The present invention also relates to a plant for the production of ceramic articles.

BACKGROUND OF THE INVENTION

In the field of the production of ceramic articles (in particular, slabs; more in particular, tiles) the use of machines for compacting semi-dry powders (ceramic powders; typically, with a moisture content of around 5-7%) is known.

These machines comprise a device for feeding ceramic powder and a conveyor assembly (typically comprising a conveyor belt), which feeds this ceramic powder to a compacting device and transfers the layer of compacted powder from the compacting device through a cutting station and, subsequently, to a kiln.

The layer of compacted powder is typically cut transversely at the cutting station and thermally treated (at high temperature) inside the kiln.

It has been experimentally observed that with a certain frequency the layer of compacted powder, before or after being thermally treated, has defects (typically cracks). In these cases, the ceramic articles obtained must be discarded. This has a negative effect on the overall efficiency and, consequently on the production costs.

WO2013050845 describes a device for processing a layer of powder material, comprising a slidable conveyor surface adapted to support and advance the layer of powder material, a compacting station adapted to compact the layer of powder material while it advances on the conveyor surface and means for trimming the side edges of the layer of powder material upstream of the compacting station.

WO2015019166 describes a method for reducing the waste of side powder of a layer of powder material advancing on a mobile conveyor surface. The strip of powder material has a cross-section similar to an isosceles trapezium with decreasing thickness at the ends. The method provides for removing the powder that, during advancing of the strip, is external to the containing elements.

The object of the present invention is to provide a machine and a method for compacting powder material and a plant for the production of ceramic articles, which allow the drawbacks of the state of the art to be at least partially solved and, at the same time, are easy and inexpensive to produce.

SUMMARY

According to the present invention a machine and a method are provided for compacting powder material and a plant for the production of ceramic articles, as defined in the following independent claims and, preferably, in any one of the claims depending directly or indirectly on the independent claims.

BRIEF DESCRIPTION OF THE FIGURES

The invention will be described below with reference to the accompanying drawings, which illustrate a non-limiting embodiment thereof, wherein.

DETAILED DESCRIPTION

Figure 1:
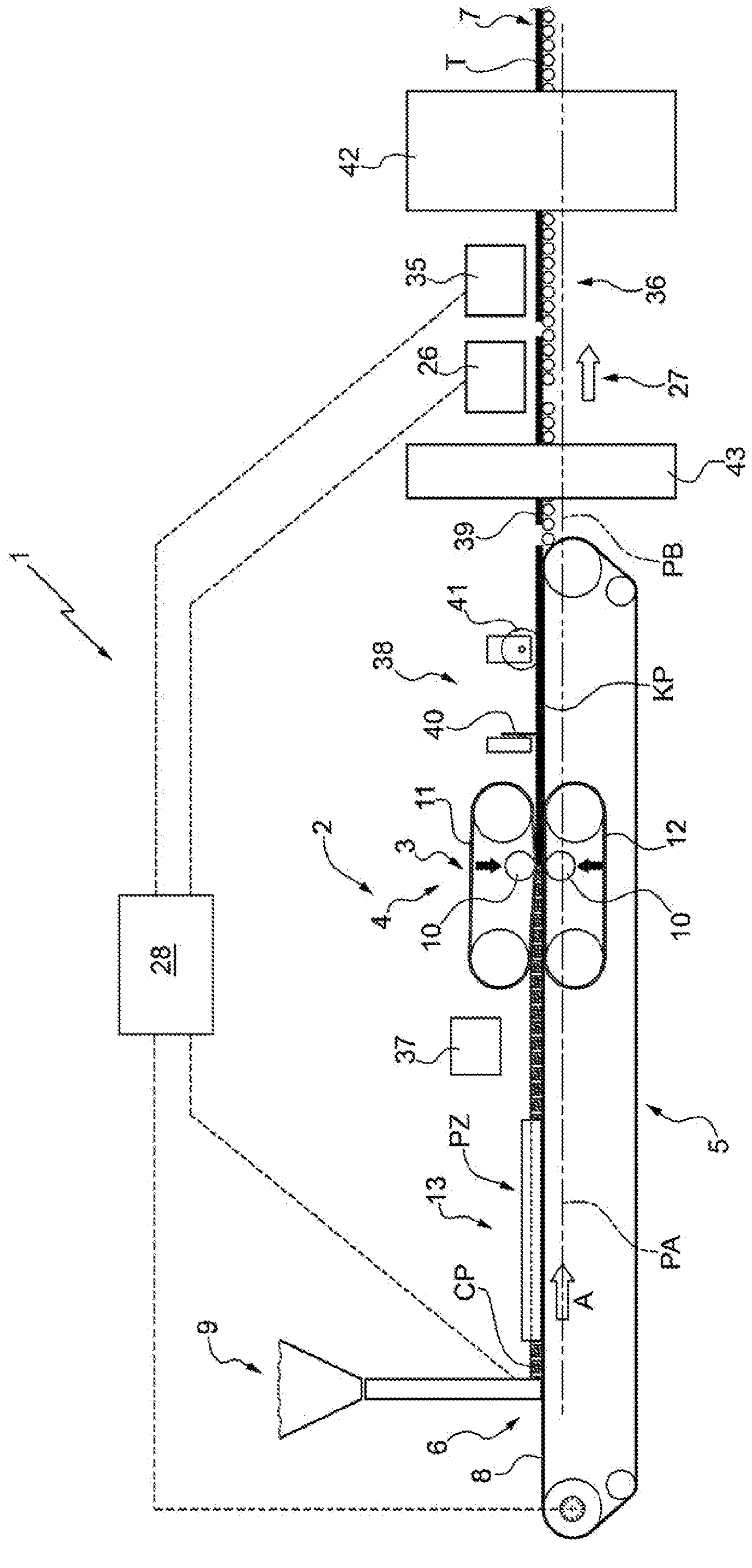
FIG. 1 is a schematic side view of a plant in accordance with the present invention.

In FIG. 1, the reference numeral 1 indicates as a whole a plant for the production of ceramic articles T. The plant 1 is equipped with a compacting machine 2 for compacting (non-compacted) powder material CP, comprising (in particular, consisting of) ceramic powder (in particular, the powder material CP is ceramic powder—for example containing clays, sands and/or feldspars).

In particular, the ceramic articles T produced are slabs (more precisely, tiles).

The machine 2 comprises a compacting device 3, which is arranged at a working station 4 and is configured to compact the powder material CP so as to obtain a layer of compacted powder KP; and a conveyor assembly 5 to convey (substantially continuously) the (a layer of) powder material CP along a portion PA of a given path (in an advancing direction A) from an input station 6 to the working station 4 and the layer of compacted powder KP (in particular, in the direction A) from the working station 4 along a portion PB of the given path (in particular, to an output station 7). In particular, the given path consists of the portions PA and PB.

In particular, the conveyor assembly 5 is also configured to support from below the powder material CP and the compacted powder material KP.

According to some non-limiting embodiments, the conveyor assembly 5 comprises a conveyor belt 8 (which, in particular, is configured to support from below the powder material CP and the compacted powder material KP).

More precisely, the conveyor belt 8 extends along (at least) part of the given path, from the input station 6 and through the working station 4.

According to some embodiments, the conveyor belt 8 comprises (is made of) metal material (for example steel).

The machine 2 is also provided with a feeding assembly 9, which is adapted to (configured to) feed the ceramic powder CP to the conveyor assembly 5 at the input station 6.

In particular, the feeding assembly 9 is adapted to (configured to) feed the ceramic powder CP to the conveyor assembly 5 substantially continuously.

According to some embodiments, the feeding assembly 9 is adapted to (configured to) carry the layer of (non-compacted) ceramic powder CP onto the conveyor belt 8.

Advantageously but not necessarily, the compacting device 3 is adapted to (configured to) exert upon the layer of ceramic powder CP a transverse pressure (to the layer of ceramic powder CP, and in particular to the direction A).

According to some embodiments, the compacting device comprises at least two compression rollers 10 arranged on opposite stripes of the (one above and the other below) conveyor belt 8 so as to exert a pressure upon the ceramic powder CP in order to compact the ceramic powder CP itself (and obtain the layer of compacted powder KP).

Although FIG. 1 illustrates only two rollers 10, in accordance with some variants, it is also possible to provide a plurality of rollers 10 arranged above and below the conveyor belt 8, as described for example in the patent EP1641607B1, from which further details of the compacting device 3 can be obtained.

Advantageously (as in the embodiment illustrated in FIG. 1) but not necessarily, the compacting device 3 comprises a pressure belt 11, which converges towards the conveyor belt 8 in the advancing direction A. In this way, a pressure is exerted (from the top down) that gradually increases in the direction A on the powder material CP so as to compact it.

According to specific non-limiting embodiments (as illustrated in FIG. 1), the compacting device 3 also comprises a counter-pressure belt 12 arranged on the opposite side of the conveyor belt 8 relative to the pressure belt 11 to co-operate with the conveyor belt 8 to provide a suitable opposition to the downward force exerted by the pressing belt 11. In particular, the pressure belt 11 and the counter-pressure belt 12 are (mainly) made of metal (steel) so that they cannot be substantially deformed while pressure is exerted on the ceramic powder.

According to some non-limiting embodiments, not illustrated, the counter-pressure belt 12 and the conveyor belt 8 coincide. In these cases, the conveyor belt 8 is (mainly) made of metal (steel) and the opposing belt 12 is absent.

Figure 2:
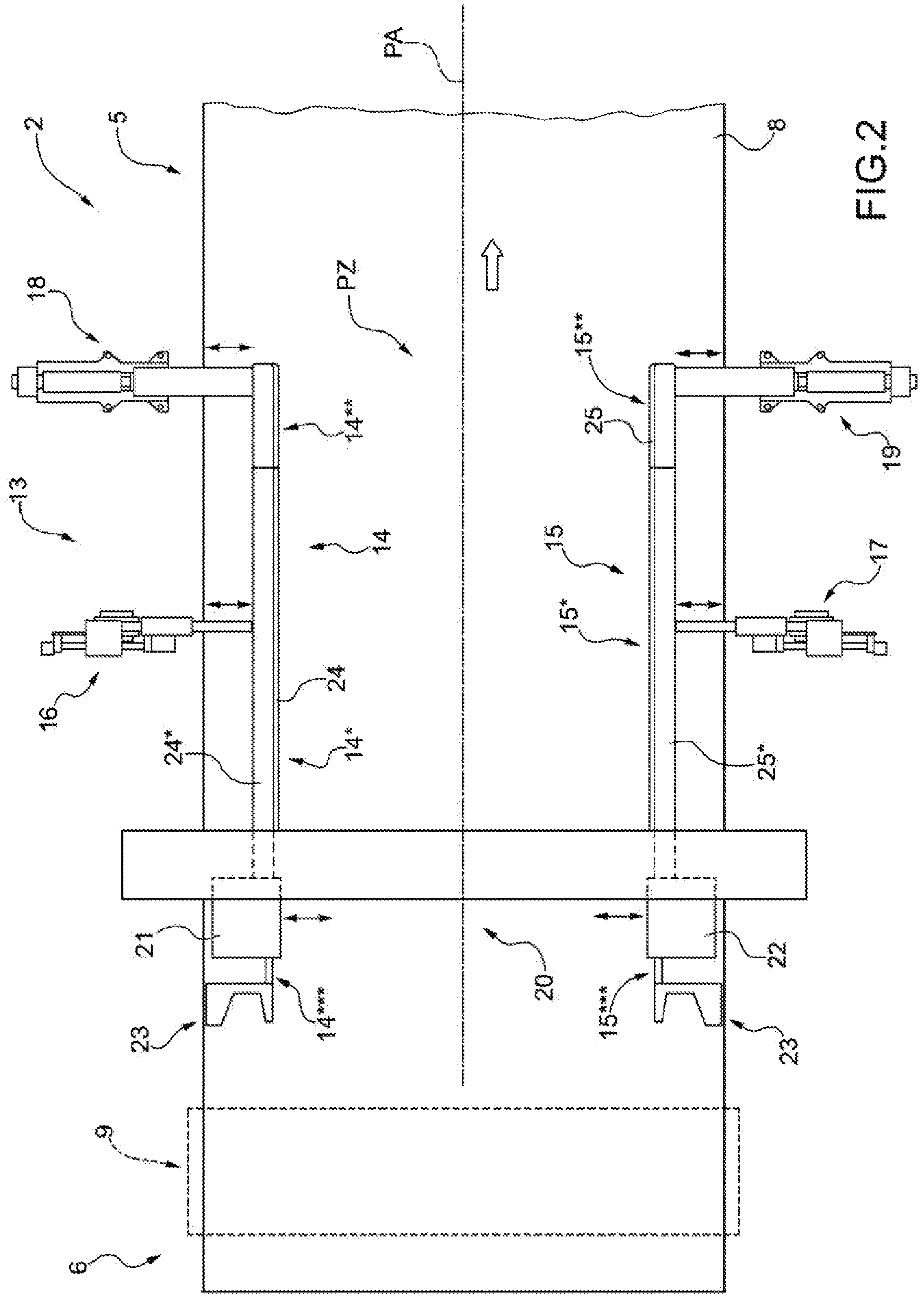
FIG. 2 is a schematic plan view on an enlarged scale of a detail of a machine of the plant of FIG. 1.
Figure 3:
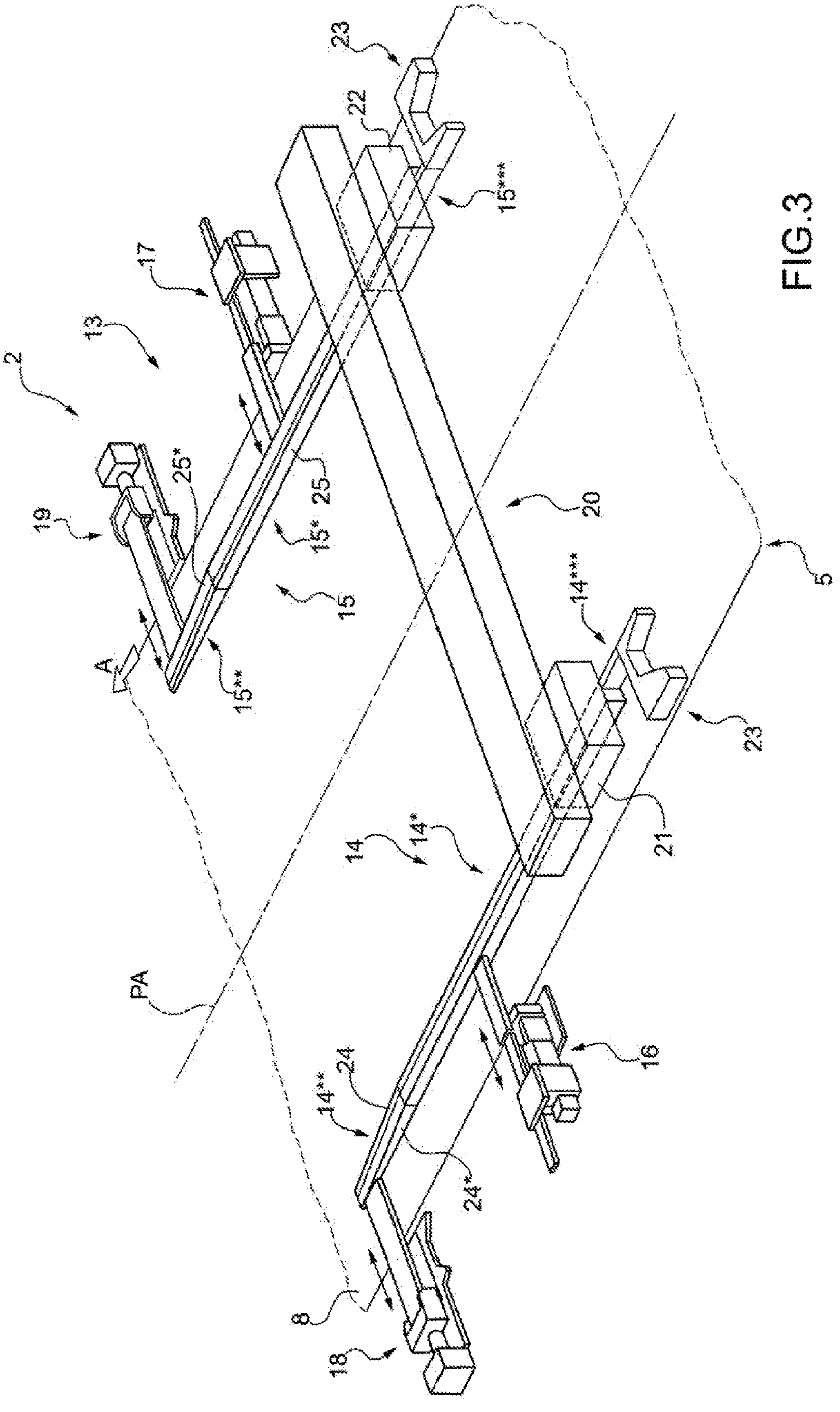
FIG. 3 is a perspective and schematic view of the detail of FIG. 2.

With particular reference to FIGS. 2 and 3, the machine 2 also comprises an adjusting assembly 13, which is adapted to (configured to) change the width of the layer of powder material CP (which, in use, is fed to the compacting device 3) and comprises at least two containing walls 14 and 15, which are arranged so as to transversely delimit (relative to the advancing direction A) a passageway area PZ for the powder material CP arranged along at least one part of the portion PA. In particular, the containing walls 14 and 15 act as side guides for the powder material CP.

More precisely, in this way it is possible to push the powder material CP arranged at the longitudinal edges (of the layer of powder material CP) so that it accumulates to a greater or lesser extent and therefore obtain an increase or decrease of the thickness (and hence of the quantity) of powder material CP at the edges of the relative layer while it is conveyed along the portion PA.

It has been experimentally observed that, surprisingly, using the machine 1 according to the present invention the possibility of cracks forming (above all at the edges of the layer of compacted powder material KP following compaction and in particular following sintering of the material) is reduced. This is presumably due to the fact that, in this way, it is possible to obtain a layer of compacted powder KP with a substantially controlled, therefore substantially homogeneous (constant), density (in particular in the direction transverse to the layer) and, therefore, with fewer internal stresses.

In particular, in other words, the adjusting assembly 13 is configured to change the width of the layer of powder material CP so as to change the quantity (in particular, the thickness) of the powder material CP at the longitudinal edges of the layer of powder material CP.

The adjusting assembly 13 further comprises at least one operating device 16 to move at least one of the containing walls 14 and 15 relative to the other containing wall 14 or 15, in particular so as to change the width of the passageway area PZ of the powder material CP (and hence the quantity—in particular, the thickness—of the powder material CP at the longitudinal edges of the layer of powder material CP). In this way, more in particular, the width of the layer of powder material CP is changed.

In particular, the aforesaid longitudinal edges (of the layer of powder material CP) extend prevalently in the direction A; more in particular, they are substantially parallel to the direction A.

Advantageously but not necessarily, the operating device 16 is adapted to (configured to) act upon the containing wall 14 so as to (at least partially) move it in particular in a direction transverse (more precisely, perpendicular) to the direction A. In particular, the adjusting assembly 13 comprises at least one further operating device 17, which is adapted to (configured to) act upon the containing wall 15 so as to at least partially move it in particular in a direction transverse (more precisely, perpendicular) to the direction A.

Due to the presence of the operating devices 16 and 17 that act upon both the containing walls 14 and 15 it is possible to keep the layer of powder material CP centred.

Advantageously but not necessarily, the operating device 16 is adapted to (configured to) act upon a portion 14* of the containing wall 14 so as to (at least partially) move the portion 14* transversely to the advancing direction A. The adjusting assembly 13 comprises another operating device 18 which is arranged downstream (relative to the direction A) of the operating device 16 and is adapted to (configured to) act upon a portion 14 of the containing wall 14 so as to (at least partially) move the portion 14** transversely to the advancing direction A. In particular, the portions 14* and 14**** are movable relative to one another.

In this way, it is possible to change the width of different portions (and optionally the shape) of the passageway area PZ. Therefore, it is possible to more accurately manage the movement (accumulation) of the powder material CP at the longitudinal edges.

According to some non-limiting embodiments, the portion 14* is joined (even more in particular, hinged) to the portion 14**.

In this way, the relative inclination of the portions 14* and 14** can be changed.

Similarly to the description above, in relation to the containing wall 14, advantageously but not necessarily, the containing wall 15 comprises at least two portions 15* and 15** (in particular, joined to one another; more in particular, hinged to one another).

More precisely, in these cases, the device 17 is adapted to (configured to) act upon the portion 15* of the containing wall so as to (at least partially) move the portion 15* transversely to the advancing direction A. The adjusting assembly 13 comprises another operating device 19 which is arranged downstream (in relation to the direction A) of the operating device 17 and is adapted to (configured to) act upon the portion 15 so as to (at least partially) move the portion 15** transversely to the advancing direction A. In particular, the portions 15* and 15**** are movable relative to one another.

According to specific non-limiting embodiments, each operating device 16 and 18 (and optionally 17 and 19) is adapted to (configured to) function independently and, in particular, comprises a respective motor independent from the motor/motors of the other operating device/devices. For example, this motor/these motors can be of the stepper, brushless, asynchronous or linear type.

Advantageously but not necessarily, the adjusting assembly 13 comprises a guide device 20 to support and guide a part of the containing wall 14 (and possibly of the containing wall 15) transversely to the direction A.

According to some non-limiting embodiments (such as the one illustrated), the guide device 20 is arranged upstream (relative to the direction A) of the operating device 16 (and possibly of the operating device 17). In other words, the operating device 16 is arranged between the guide device 20 and the operating device 18; the operating device 17 is arranged between the guide device 20 and the operating device 19.

Advantageously but not necessarily, the guide device 20 is arranged at an end of the portion 14* (in particular, opposite the portion 14). Additionally or alternatively, the guide device 20 is arranged at an end of the portion 15* (in particular, opposite the portion 15****).

According to specific non-limiting embodiments, the guide device 20 comprises an upright, which is transverse to the direction A and which, in particular, extends over the conveyor belt 8 (so as to pass through it completely). In these cases, the guide device 20 also comprises a slide 21 adapted to (configured to) slide along the upright and connected (integrally) to the containing wall 14 (in particular, to the portion 14*, more in particular, to the end of the portion 14* opposite the portion 14), and a slide 22 adapted to (configured to) slide along the upright and connected (integrally) to the containing wall 15 (in particular, to the portion 15*, more in particular, to the end of the portion 15* opposite the portion 15****).

Advantageously but not necessarily, the guide device 20 is also adapted to (configured to) exert a force on the containing wall 14 (and on the containing wall 15) so as to (at least) partially move it (them) in a direction transverse to the direction A.

According to specific non-limiting embodiments, the guide device 20 comprises a chain actuator (of a known type, not illustrated) at least partially arranged on the aforesaid upright. In particular, this chain actuator acts on the slides 21 and 22.

Advantageously but not necessarily, the adjusting assembly 13 comprises trimming means 23 to trim the longitudinal edges of the layer of (non-compacted) powder material CP. In particular, these trimming means 23 are as described in the patent application with publication number WO2013050845 by the same applicant.

Advantageously but not necessarily, the trimming means 23 are arranged upstream of the portion 14* and of the portion 15* (in particular, upstream of the containing walls 14 and 15).

According to some non-limiting embodiments, the containing wall 14 comprises a further portion 14* connected to the trimming means 23 (and to the portion 14*). In particular, the portion 14*** is arranged between the trimming means 23 and the portion 14*** (connecting them).

Advantageously but not necessarily, the portion 14* is at least partially deformable (for example comprises a polymer material) so as to allow a relative movement of the portion 14* relative to the trimming means 23 (and to the portion 14***). In particular, the trimming means 23** are substantially fixed (optionally, their position can be changed—manually—only during a format change of the ceramic articles T to be produced).

More precisely, the portion 14* extends from the trimming means 23 to the slide 21**.

Similarly, according to some non-limiting embodiments, the containing wall 15 comprises a further portion 15* connected to the trimming means 23 (and to the portion 15*). In particular, the portion 15*** is arranged between the trimming means 23 and the portion 15*** (connecting them).

Advantageously but not necessarily, the portion 15* is at least partially deformable (for example comprises a polymer material) so as to allow a relative movement of the portion 15* relative to the portion 15*****.

More precisely, the portion 15* extends from the trimming means 23 to the slide 22**.

Advantageously but not necessarily, the containing wall 14 comprises a contact layer 24 (facing the containing wall 15), which is adapted to (configured to) come into contact with the powder material CP and which comprises, in particular consists of, a polymer material. In this way problems of wear are reduced.

According to some non-limiting embodiments, the contact layer 24 comprises (is made of) a different material at the portion 14 and at the portion 14* (and at the portion 14*****).

In particular, the contact layer 24 arranged at the portion 14** comprises (is made of) polyurethane.

Advantageously but not necessarily, the containing wall 14 also comprises a support layer 24* (in particular, made of a more rigid material relative to that of the contact layer 24; for example, of metal). The contact layer 24 is arranged between the support layer 24* and the inside of the passageway area PZ.

Advantageously but not necessarily, the containing wall 15 comprises a contact layer 25 (facing the containing wall 15), which is adapted to (configured to) come into contact with the powder material CP and which comprises, in particular consists of, a polymer material. In this way problems of wear are reduced.

According to some non-limiting embodiments, the contact layer 25 comprises (is made of) a different material at the portion 15 and at the portion 15* (and at the portion 15*****).

In particular, the contact layer 25 arranged at the portion 15** comprises (is made of) polyurethane.

Advantageously but not necessarily, the containing wall 15 also comprises a support layer 25* (in particular, made of a more rigid material—for example metal—relative to that of the contact layer 25). The contact layer 25 is arranged between the support layer 25* and the inside of the passageway area PZ.

According to some non-limiting embodiments, the passageway area PZ is at least partially tapered in the advancing direction A.

Advantageously but not necessarily, the machine 2 comprises a detection device 26, which is adapted to (configured to) detect the density of the layer of compacted ceramic powder KP and is arranged at a detection station 27 along the second portion PB of the given path.

Advantageously but not necessarily, the machine 2 also comprises a control device 28 (configured) to control the adjusting assembly 13 (in particular the operating device/devices 16, 17, 18 and/or 19) so as to change (over time, in particular as a function of the data detected by the detection device 27) the width of the passageway area PZ (more precisely, the width of the layer of powder material CP) and (therefore) the quantity (in particular, the thickness) of the powder material at the longitudinal edges of the layer of powder material CP. In particular, the detection device 27 is connected to the control device 28.

In this way it is possible to change the thickness of the layer of powder material CP substantially continuously. It has been experimentally observed that surprisingly in this way the possibility of cracks forming (above all at the side edges of the layer of compacted powder material KP) is furthermore reduced. It has been assumed that in this way it is possible to rapidly adapt to the different working conditions.

In particular, in use, if a density below a first reference density is detected, the width is decreased and, if a density above a second reference density (different or equal to the first density; typically, greater than the first reference density) is detected, the width is increased.

According to some non-limiting embodiments, the detection device 26 is adapted to (configured to) detect the density of the layer of compacted ceramic powder KP at side edges (which extend prevalently in the direction A; more in particular, they are substantially parallel to the direction A) of the layer of compacted powder material KP; the control device 28 is adapted to (configured to) control the adjusting assembly 13 so as to change over time the width of the layer of powder material CP as a function of the density detected of the layer of compacted ceramic powder KP at the side edges of the layer of compacted powder material KP.

By edges that extend prevalently in one direction, we mean edges that form, with this direction, an angle of less than 45°.

Figure 4:
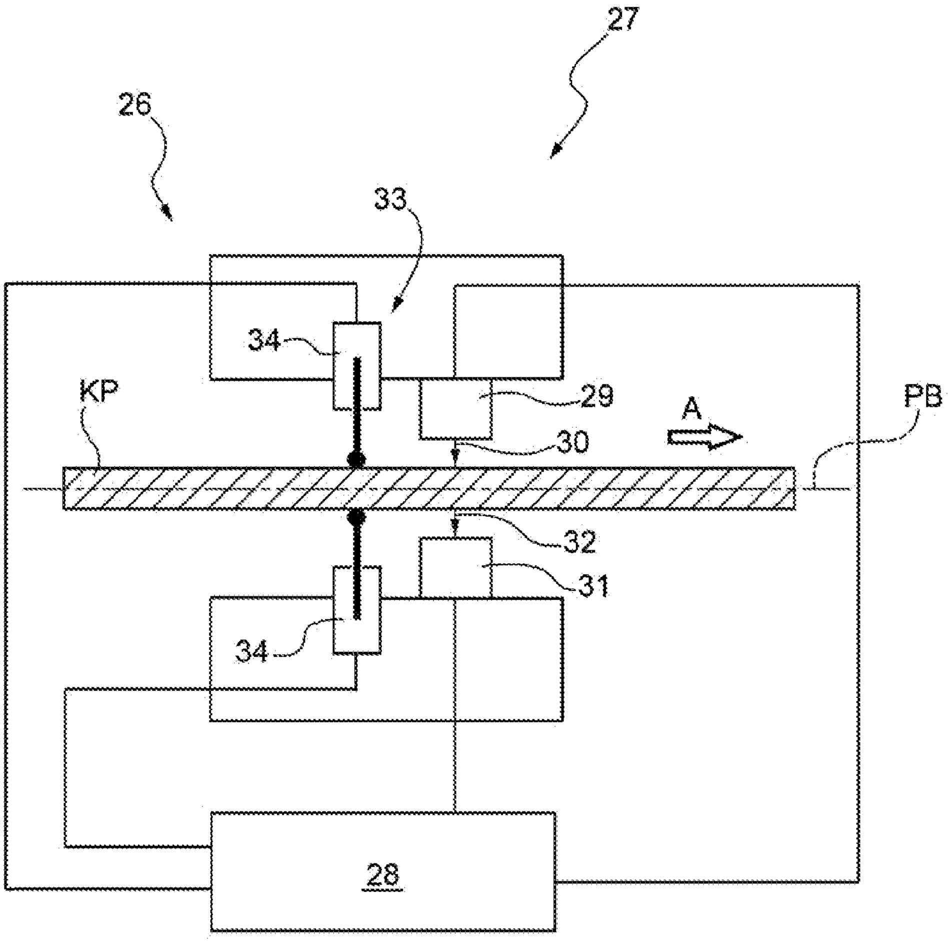
FIG. 4 is a schematic and partially sectional view of a detail of the plant of FIG. 1.

With particular reference to FIG. 4, advantageously but not necessarily, the detection device 26 comprises a sending unit 29, which is adapted to (configured to) send a signal 30 towards the layer of compressed ceramic powder KP and a receiving unit 31, which is arranged on the opposite stripe of the second portion PB of the given path relative to the sending unit 29 and is adapted to (configured to) receive a signal 32 coming from the sending unit 29 and has passed through the layer of compressed ceramic powder KP. In particular, the signal 30 is chosen in the group consisting of: X radiation, γ (gamma) radiation, ultrasound signal and a combination thereof. In some cases, the signal is chosen in the group consisting of: X radiation, ultrasound signal and a combination thereof.

In particular, the detection device 8 comprises a measurement unit 33 for calculating the thickness of the layer of compacted ceramic powder KP. More in particular, the measurement unit 33 comprises two distance sensors 34, which detect the distance from the upper and lower surfaces of the layer of compacted ceramic powder KP and, by means of the difference (relative to a fixed reference distance), determine the thickness. Typically, the sending unit 29 and receiving unit 31 are arranged a few millimetres downstream of the measurement unit 33 along the second portion PB.

In particular, by processing the absorption signal of the X radiation (difference between the intensity of 30 and 32) and taking into account the thickness measured with the sensors 34, information correlated to the density of the material is obtained.

According to further embodiments, it is also possible to use a plurality of sending units 29 and of receiving units 31 so as to simultaneously monitor the density of several areas of the layer of compacted ceramic powder KP (for example two areas, each at the side edges of the layer of compacted powder KP).

During normal production of the ceramic articles T, the detection device 27 can thus continuously monitor the trend of the density of the material, accumulating information in the form of density profiles.

This information is used by the control device 10 to adjust the width of the passageway area PZ (and, therefore, of the layer of powder material CP).

The detection device 26 and its operation (together with that of the control device 28) are described in greater detail in the patent application with publication number WO2017/216725 by the same applicant.

According to some non-limiting embodiments, the feeding assembly 9 comprises a dispensing unit 53 similar to the dispensing unit described in WO2017/216725 (identified therein with the number 21).

According to some non-limiting embodiments, the plant 1 comprises a printing device 35 (FIG. 1), which is adapted to (configured to) produce a graphic decoration over the layer of compacted ceramic powder KP conveyed by the conveyor assembly 5 and is arranged at a printing station 36 (arranged upstream of the output station 7) along the given path (in particular, along the portion PB) downstream of the working station 4. In particular, the control unit 28 is adapted to (configured to) control the printing device 35 so as to produce a desired graphic decoration.

Advantageously but not necessarily, the plant 1 comprises a further application assembly 37 to at least partially cover the powder material CP with a layer of a further powder material. In particular, the application assembly 37 is arranged along the given path (more precisely along the portion PA) upstream of the working station 4 (and upstream of the printing station 36).

In particular (see FIG. 1), the plant 1 (more precisely the machine 2) also comprises a cutting assembly 38 to transversely cut the layer of compacted ceramic powder KP so as to obtain slabs (basic articles) 39, each of which has a portion of the layer of compacted ceramic powder KP. More in particular, the cutting assembly 38 is arranged along the portion PB of the given path (between the working station 4 and the printing station 36). The slabs 39 comprise (consist of) compacted ceramic powder KP.

Advantageously but not necessarily, the cutting assembly 38 comprises at least one cutting blade 40, which is adapted to (configured to) come into contact with the layer of compacted ceramic powder KP to cut it transversely (to the direction A).

Advantageously but not necessarily, the cutting assembly 38 is adapted to (configured to) longitudinally cut the layer of compacted ceramic powder KP (so as to trim its edges).

According to some non-limiting embodiments, the cutting assembly also comprises at least two further blades 41, which are arranged on opposite sides of the portion PB and are adapted to (configured to) cut the layer of compacted ceramic powder KP and define the side edges of the slabs 39 (and substantially parallel to the direction A)—optionally dividing the slab into two or more longitudinal portions. In some specific cases, the cutting assembly 38 is as described in the patent application with publication number EP1415780.

In particular, the plant 1 comprises at least one firing kiln 42 to sinter the layer of compacted powder KP of the slabs 39 so as to obtain the ceramic articles T. More in particular, the firing kiln 42 is arranged along the given path (more precisely along the portion PB) downstream of the printing station 36 (and upstream of the output station 7).

According to some non-limiting embodiments, the plant 1 also comprises a dryer 65 arranged along the portion PB downstream of the working station 4 and upstream of the printing station 43.

In some cases, the feeding assembly 9 is adapted to (configured to) convey a layer of (non-compacted) powder material CP to (onto) the conveyor assembly 5 (in particular, onto the conveyor belt 8; more in particular at the input station 6); the compacting device 3 is adapted to (configured to) exert on the layer of ceramic powder CP a pressure transverse (in particular, normal) to the surface of the conveyor belt 8.

According to some non-limiting embodiments, the conveyor assembly 5 comprises a series of conveyor rollers arranged downstream of the conveyor belt 8.

According to one aspect of the present invention, a method is provided for compacting a powder material CP comprising ceramic powder. The method comprises at least one compacting step, during which a layer of powder material CP is compacted, at a working station 4, so as to obtain a layer of compacted powder material KP; a conveying step, during which the powder material CP is conveyed by means of a conveyor assembly 5 along a first portion PA of a given path from an input station 6 to the working station 4 and the layer of compacted powder material KP is conveyed from the working station 4 along a second portion PB of the given path; and a feeding step, during which the powder material CP is fed to the conveyor assembly 5 at the input station 6 by means of a feeding assembly 9.

In particular, the conveying step and the feeding step are (at least partially) simultaneous.

According to some embodiments, the conveying step is (at least partially) simultaneous to the compacting step.

The method also comprises an adjusting step, during which an adjusting assembly 13 changes (over time) the width of the layer of powder material CP along at least part of the first portion PA. In particular, in this way the quantity (the thickness) of the powder material CP at the longitudinal edges (which extend prevalently in the direction A; more in particular are substantially parallel to the direction A) of the layer of powder material CP is changed.

In other words, in particular, during the adjusting step, the adjusting assembly 13 changes (over time) the quantity (in particular, the thickness) of the powder material CP at the longitudinal edges of the layer of powder material CP (changing—over time—the width of the layer of powder material CP).

Advantageously but not necessarily, the adjusting step is (at least partially) simultaneous to the conveying step and to the compacting step.

Advantageously but not necessarily, the method comprises a detection step, during which the density of the layer of compacted ceramic powder KP is detected at a detection station 27 arranged along the second portion PB of the given path. During the adjusting step, the adjusting assembly 13 changes (over time) the width of the layer of powder material CP (in particular, of a passageway area PZ for the powder material CP) along at least part of the first portion PA as a function of the data detected during the detection step (more in particular, as a function of the density detected of the layer of compacted ceramic powder KP at the side edges of the layer of compacted powder material KP).

In particular, during the adjusting step, the adjusting assembly 13 changes (over time) the quantity (in particular, the thickness) of the powder material CP at the longitudinal edges of the layer of powder material CP (changing—over time—the width of the layer of powder material CP) as a function of the data detected during the detection step (more in particular, as a function of the density detected of the layer of compacted ceramic powder KP at side edges of the layer of compacted powder material KP).

According to some non-limiting embodiments, during the detection step, the density of the layer of compacted ceramic powder KP at side edges (which extend prevalently in the direction A, more in particular are substantially parallel to the direction A) of the layer of compacted powder material KP is detected. During the adjusting step, the adjusting assembly 13 changes (over time) the width of the layer of powder material CP (in particular, of the passageway area PZ for the powder material CP) along at least part of the first portion PA as a function of the density detected of the layer of compacted ceramic powder KP at side edges of the layer of compacted powder material KP.

In particular, during the adjusting step, the adjusting assembly changes (over time) the quantity (in particular, the thickness) of the powder material CP at the longitudinal edges of the layer of powder material CP (changing—over time—the width of the layer of powder material CP) as a function of the data detected during the detection step (more in particular, as a function of the density detected of the layer of compacted ceramic powder KP at side edges of the layer of compacted powder material KP) so as to maintain the quantity (in particular, the thickness) of the powder material CP at the longitudinal edges of the layer of powder material CP between a minimum and a maximum.

In accordance with a further aspect of the present invention, a process is provided for producing ceramic articles T. The process comprises a method for compacting a powder material comprising ceramic powder; the method being as described above.

The process further comprises a cutting step, during which the layer of compacted ceramic powder KP is cut transversely (and in particular, longitudinally) so as to obtain basic articles 39, each having a portion of the layer of compacted ceramic powder KP; and a firing step, during which the compacted ceramic powder KP of the basic articles 39 is sintered so as to obtain the ceramic articles T.

Advantageously but not necessarily, the adjusting assembly 13 comprises two containing walls 14 and 15 (which act as side guides for the powder material CP), arranged so as to transversely delimit the passageway area PZ of the powder material CP arranged along at least part of the first portion PA, and at least one first operating device 16, which moves at least one of the containing walls 14 and 15 relative to the other containing wall 14 or 15 so as to change the width of the passageway area PZ (in particular, so as to change the width of the layer of powder material CP); during the conveying step, the layer of powder material CP passes through the passageway area PZ.

Advantageously but not necessarily, during the adjusting step, the adjusting assembly 13 changes the width of different portions of the passageway area PZ in a differentiated manner.

According to some non-limiting embodiments, the method is implemented by the machine 2 as described above.

Unless specifically indicated to the contrary, the content of the references (articles, books, patent applications etc.) cited in this text is fully incorporated herein. In particular, the references mentioned are incorporated herein by reference.

The invention claimed is:

1. A method for compacting a powder material comprising ceramic powder, the method comprising:

at least one compacting step, during which a layer of powder material is compacted, at a working station, so as to obtain a layer of compacted powder material;

a conveying step, during which the powder material is conveyed, by means of a conveyor assembly, along a first portion of a given path from an input station to the working station and the layer of compacted powder material is conveyed from the working station along a second portion of the given path;

a feeding step, during which the powder material is fed to the conveyor assembly at the input station by means of a feeding assembly, wherein the conveying step and the feeding step are at least partially simultaneous;

an adjusting step, during which an adjusting assembly changes the width of the layer of powder material along at least part of the first portion by pushing the powder material so that the powder material accumulates to locally change a thickness of the powder material during the adjusting step; and a detection step, during which the density of the layer of compacted ceramic powder is detected at a detection station arranged along the second portion of the given path, wherein during the adjusting step, the adjusting assembly changes the width of the layer of powder material along at least part of the first portion as a function of the data detected during the detection step, and wherein the width of the layer of powder material is adjusted at least partially while the powder material is conveyed, by means of the conveyor assembly, along said first portion of said given path.

2. The method according to claim 1, wherein the adjusting step is at least partially simultaneous to the compacting step.

3. The method according to claim 1, wherein, during the detection step, the density of the layer of compacted ceramic powder is detected at side edges of the layer of compacted powder material, wherein during the adjusting step, the adjusting assembly changes the width of the layer of powder material and therefore the quantity of the powder material at the longitudinal edges of the layer of powder material along at least part of the first portion as a function of the detected density of the layer of compacted ceramic powder at side edges of the layer of compacted powder material.

4. The method according to claim 1, wherein the adjusting assembly comprises:

a first containing wall and at least one second containing wall, which are arranged so as to transversely delimit a passageway area for the powder material, which is arranged along at least part of the first portion; and at least one first operating device, which, during the adjusting step and at least partially the conveying step, moves at least one between the first containing wall and the second containing wall relative to the other one so as to change the width of the passageway area for the layer of powder material, and thus change the width of the layer of powder material, wherein during the conveying step, the layer of powder material passes through the passageway area.

5. The method according to claim 4, wherein, during the adjusting step, the adjusting assembly changes the width of different portions of the passageway area in a differentiated manner.

* * * * *